Dec. 30, 1930.   F. C. REINKE   1,787,261
ENSILAGE DISTRIBUTOR
Filed May 5, 1928   2 Sheets-Sheet 1

INVENTOR.
Fred C. Reinke
BY
Morsell, Keeney & Morsell
ATTORNEYS.

Dec. 30, 1930.  F. C. REINKE  1,787,261
ENSILAGE DISTRIBUTOR
Filed May 5, 1928  2 Sheets-Sheet 2
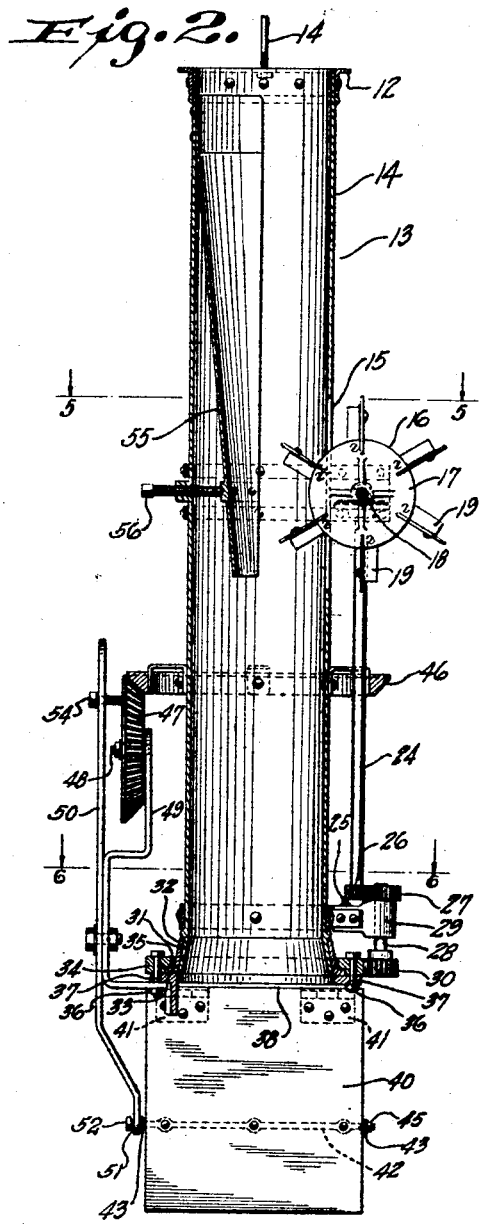

Patented Dec. 30, 1930

1,787,261

UNITED STATES PATENT OFFICE

FRED C. REINKE, OF MUKWONAGO, WISCONSIN

ENSILAGE DISTRIBUTOR

Application filed May 5, 1928. Serial No. 275,441.

This invention relates to improvements in ensilage distributors.

It is common practice, in filling silos with ensilage, to employ a blower to convey the fodder to an opening in the top of the silo. Through this opening the material is discharged, the latter heaping up at a point directly below the discharge opening of the blower. Because of this uneven distribution in the bottom of the silo, it is necessary to employ men to spread the ensilage as it is fed in by the blower. This spreading by hand not only consumes considerable time, but it is detrimental to the ensilage to have the men tramping upon it in the silo.

It is one of the objects of this invention to provide an ensilage distributor which will automatically spread the ensilage evenly throughout the silo as it is fed in by the blower, obviating the necessity of doing the spreading by hand.

It is a further object of this invention to provide an ensilage distributor having a spreading member which has both circular and reciprocal movement at the same time, to most efficiently spread the ensilage.

It is a further object of this invention to provide means for imparting rotary and reciprocal motion to the spreading member, which means is driven by the falling ensilage.

It is a further object of this invention to provide an ensilage distributor having a pair of spaced apart spreading plates with means for adjusting the distance between said plates to render the device suitable for distributing a large or small flow of ensilage.

It is a further object of this invention to provide an ensilage distributor which is simple in construction, efficient in operation, and well adapted for the purpose described.

With the above and other objects in view, the invention consists of the improved ensilage distributor and all its parts and combinations as set forth in the claims, and all equivalents thereof.

In the accompanying drawing, in which the same reference characters designate the same parts in all of the views:

Fig. 2 is a vertical sectional view taken through the ensilage distributor;

Fig. 3 is a detail view of the lower end of the distributor;

Fig. 4 is a fragmentary view of the distributor showing the propeller and gearing in connection therewith;

Figure 1:
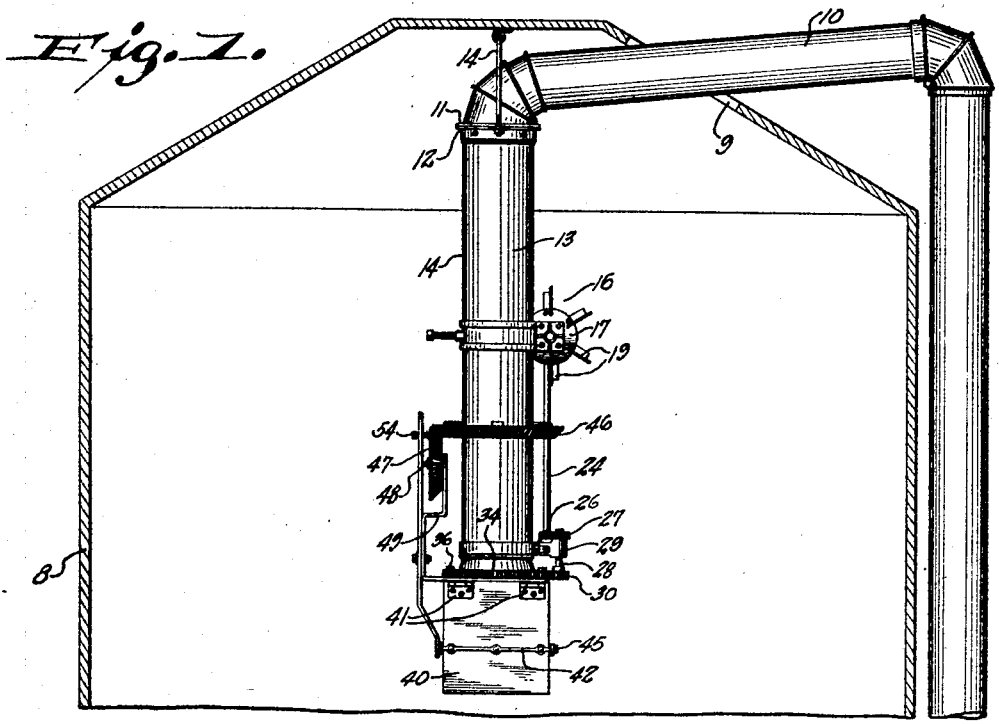
Fig. 1 is a vertical sectional view through the upper portion of a silo, showing the blower and distributor in attachment therewith, part being broken away.
Figure 5:
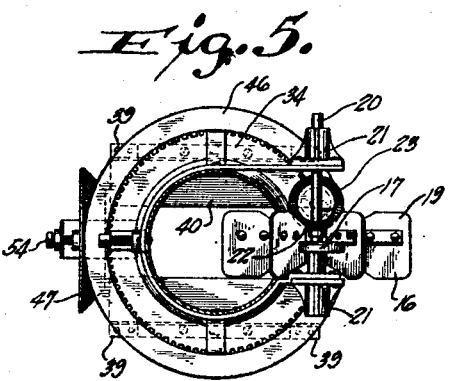
Fig. 5 is a sectional view taken on the line 5—5 of Fig. 2.
Figure 6:
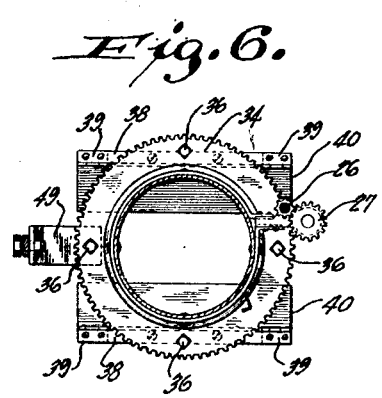
Fig. 6 is a sectional view taken on the line 6—6 of Fig. 2.

Referring to the drawing, the numeral 8 designates a silo having an upper opening 9, through which the upper end of a blower pipe 10 extends. The discharge end of the blower pipe is formed with a connecting flange 11 which is bolted or otherwise secured to a flange 12 on the upper end of the ensilage distributor 13. The ensilage distributor is suspended from the roof of the silo by a bail 14 which extends from the upper end of the distributor.

The body portion 14 of the distributor is tubular in shape and is formed preferably of metal. In one side of the tubular body, at an intermediate point, is an opening 15 for a propeller 16. The propeller comprises a disk 17 having a central opening 18 and having a plurality of blades 19 secured at intervals to its outer periphery. The blades are disposed at right angles to the disk. The propeller is rigidly mounted on a shaft 20, the latter extending through the opening 18 and having its ends journaled in bearings 21 on the tubular body.

The shaft 20 carries rigidly a small bevel gear 22 which meshes with the larger bevel gear 23 mounted rigidly on the upper end of a vertically extending shaft 24. The latter shaft is journaled in bearings 25. On the lower end of the shaft 24 is a pinion 26 which engages a pinion 27 on the upper end of a short shaft 28, the latter being journaled in a bearing 29. On the lower end of the shaft 28 is a rigidly mounted pinion 30.

The lower end of the tubular body portion is enlarged as at 31, and has secured thereto an annular member 32 which is L-shaped in cross section forming an annular flange 33 on the lower end of the tubular body portion. A ring gear 34 having an inner annular recess 35 for receiving the annular recess 33 rests on the flange, and is adapted to rotate on the same. The ring gear 34 meshes with the pinion 30 on the lower end of the shaft 28.

Secured to the ring gear by bolts and nuts 36 is a ring 37. Metal strips 38, each having a pair of hinge members 39 on the lower side, are secured to opposite portions of the ring 37. A pair of spreading plates 40 carry complementary hinge members 41, the latter being pivotally connected to the hinge members 39 to allow the plates 40 to swing back and forth. A rod 42 is secured to and extends across an intermediate portion of each plate. Each rod has projecting threaded end portions. Strips 43 having a plurality of perforations 44 near each end, connect the ends of the rods to hold the plates in spaced apart relation. Nuts 45 secure the strips on the projecting ends of the rods 42. The plurality of perforations 44 allow the space between the plates to be varied when desired. For a small flow of ensilage it is preferable to have the plates close together, and for a large flow the plates must be spread farther apart to prevent the material from clogging up in the space between the plates.

On an intermediate portion of the tubular body is a fixed ring bevel gear 46. The latter meshes with a bevel gear 47 revoluble on a pin 48 extending from an arm 49. The lower end of the arm 49 is secured to the ring 37. The intermediate portion of the arm 49 is U-shaped and has pivoted thereto a crank 50. The lower end of the crank has a perforation 51 therein through which a bolt 52 extends to pivotally connect the end of the crank with the strip 43. The upper end of the crank is formed with a slot 53 through which a stud screw 54 extends, the stud being eccentrically positioned on the outer face of the gear 47 in any one of the perforations 54'.

Within the tubular body portion is a guiding strip 55 which is engaged by an adjustment screw 56. By turning the screw 56, the strip 55 may be adjusted toward or away from the propeller 16 to most efficiently guide the falling ensilage over the blades of the propeller.

The operation of the device is as follows: The ensilage is forced into the upper end of the tubular body portion by the blower, and it is then guided over the propeller blades by the guiding members 55. The force of the blower and the weight of the falling ensilage act upon the blades 19 to cause a rotation of the propeller. The movement of the propeller is transmitted to the vertical shaft 24 by the gears 22 and 23, and by the pinions 26, 27, and 30 is in turn transmitted to the ring gear 34. The latter gear revolves around the tubular body portion carrying the spreading plates 40 in a circular course.

At the same time, the arm 49, upon which the bevel gear 47 is mounted, is carried around in a circle, the gear 47 being rotated by reason of its engagement with the fixed gear 46. As the gear 47 revolves, it imparts motion to the crank 50, the latter causing the spreading plates 40 to reciprocate back and forth as they travel in a circle with the gear 34. The ensilage falling between the plates is therefore distributed evenly throughout the silo by reason of the simultaneous circular and reciprocal movement of the spreading plates.

The plurality of perforations 54' on the gear 47 allows an adjustment of the crank 50. When the bolt 54 is in one of the outer perforations, the angle of swing of the spreading plates will be greater than when in the inner perforations. Generally, when starting to fill a silo, one of the inner perforations is used, and when the silo is partly filled, the angle of spread is increased by using one of the outer perforations.

From the foregoing description it may be seen that the improved ensilage distributor is simple in construction, efficient in operation, and well adapted for the purpose described.

What I claim is:

1. An ensilage distributor comprising a tubular body portion having an opening at one end for receiving falling ensilage and having an opening at its other end for discharging the same, a spreading member connected to the tubular body portion adjacent the discharge opening, a propeller extending within the tubular body portion and operated by the falling ensilage, adjustable means for guiding the ensilage toward said propeller, and means operated by said propeller for imparting reciprocal motion to said spreading member.

2. An ensilage distributor comprising a tubular body portion having an upper opening for receiving falling ensilage, having a lower opening for discharging the same, and having a side opening, a ring gear adjacent the discharge opening of the tubular body portion and revoluble about the same, a pair of spaced apart spreading plates pivotally secured to said ring gear, a propeller extending within the side opening of the tubular body portion and operated by the falling ensilage, means between said propeller and said ring gear for rotating said gear, and upwardly extending arm secured to the ring gear, a vertically positioned bevel gear rotatably mounted on said arm, a fixed ring bevel gear surrounding an intermediate portion of the tubular body, said bevel gears engaging one another, a crank pivotally connected to an intermediate portion of the upwardly extending arm, the upper end of said crank being slotted, a bolt projecting from an eccentric portion of the vertically positioned bevel gear and extending through the the slot in the crank, and means for holding the spreading plates in spaced apart position, the lower end of the crank being in pivotal connection with said spreading plates to impart reciprocal motion to the same.

3. An ensilage distributor comprising a tubular body portion having an opening for receiving falling ensilage and having another opening for discharging the same, a spreading member connected to the tubular body portion adjacent the discharging opening, operating means extending within the tubular body portion and operated by the falling ensilage, adjustable means for guiding the ensilage towards said operating means, and means operated by said operating means for imparting reciprocal motion to said spreading member.

In testimony whereof, I affix my signature.

FRED C. REINKE.